(12) United States Patent
Kratochwil (10) Patent No.: US 6,442,212 B1
(45) Date of Patent: Aug. 27, 2002

(54) METHOD AND APPARATUS FOR TRANSMISSION OF DIGITAL DATA

(75) Inventor: Konrad Kratochwil, Vienna (AT)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/169,317

(22) Filed: Oct. 9, 1998

(30) Foreign Application Priority Data

Oct. 10, 1997 (AU) ................................ 1719/97

(51) Int. Cl.[7] .......................... H04L 5/12; H04L 27/06

(52) U.S. Cl. ........................................ 375/265; 375/341

(58) Field of Search ........................... 375/341, 265, 375/262; 714/794, 795, 792, 796

(56) References Cited

U.S. PATENT DOCUMENTS

| | | | | |
|---|---|---|---|---|
| 5,740,206 A | * | 4/1998 | Lomp et al. | 375/346 |
| 5,938,791 A | * | 8/1999 | Narahara | 714/795 |
| 6,111,923 A | * | 8/2000 | Mueller et al. | 375/341 |

OTHER PUBLICATIONS

Rounded Metric Viterbi Decoding of Trellis Coded Modulation in Presence of Intersymbol Interference, Electronics Letters, Jul. 21, 1988, vol. 24, No. 15, pp. 946–947.

* cited by examiner

*Primary Examiner*—Tesfaldet Bocure
*Assistant Examiner*—Khai Tran
(74) *Attorney, Agent, or Firm*—Carlton H. Hoel; W. James Brady; Frederick J. Telecky, Jr.

(57) ABSTRACT

A Viterbi type decoder which discards paths with metrics more than a distance from the smallest metric with the distance determined by the smallest distance between paths in the trellis.

15 Claims, 4 Drawing Sheets

METHOD AND APPARATUS FOR TRANSMISSION OF DIGITAL DATA

BACKGROUND OF THE INVENTION

The invention relates to transmission of digital information, and in particular, to receivers and decoding methods for digital information transmission.

Figure 1:
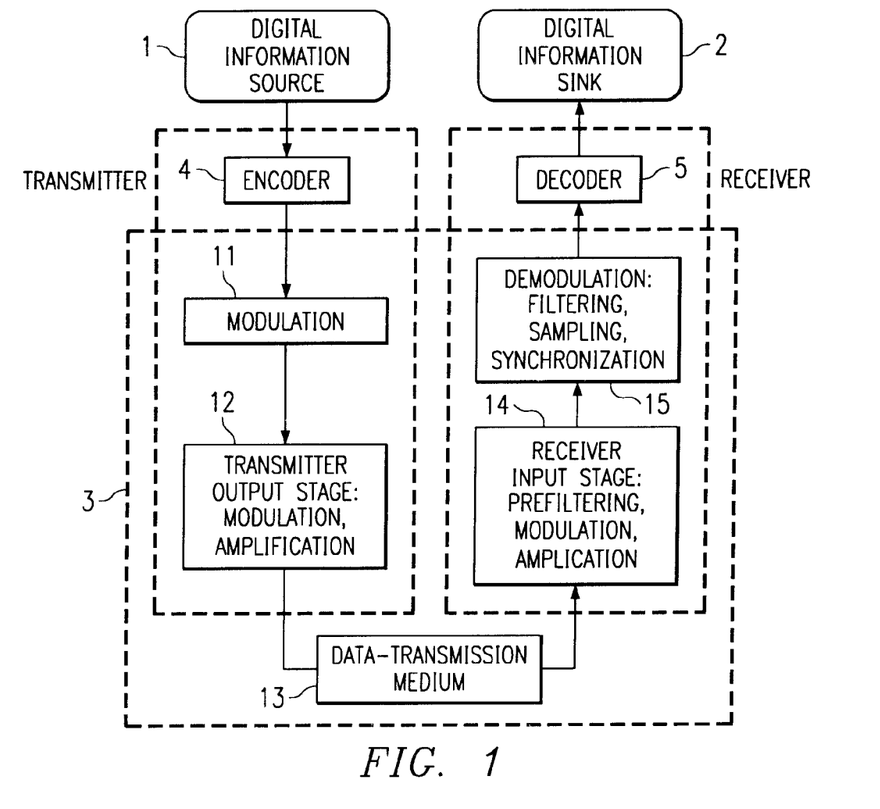
FIG. 1 is a schematic block diagram of a digital communication system.

FIG. 1 illustrates a generic digital communications system (such as mobile, satellite, wireline, TV broadcast, air traffic control, car-phone, PCS, and so forth) for transmission of digital information (such as speech, audio, video, data, and so forth) from a digital information source via an encoder and a data channel to a digital information sink which is preceded by a decoder in which the data transmitted by the information source are equalized and decoded (reconstructed) and where the most-likely-transmitted data sequence is forwarded to the information sink. Typically, non-ideal characteristics of the data channel lead to intersymbol interference (ISI) of the transmitted symbols. The optimum receiver for ISI channels in terms of error event probability is the maximum likelihood sequence estimator (NESE) implemented with the Viterbi Algorithm (VA); see for example, Lou, Implementing the Viterbi Algorithm, IEEE Signal Processing Mag. 42–52 (September 1995).

Since the complexity of the VA grows exponentially with the length of the channel impulse response, a number of methods have been proposed to achieve the performance of the VA with reduced complexity. These methods are based on one of the following approaches: (1) consider only a fixed number of most likely state sequences of the VA at each symbol interval: (2) truncate the length of the channel impulse response by a prefilter such as with decision feedback sequence estimation; (3) use the idea of set partitioning known from trellis coded modulation; and (4) at each time step only extend those paths whose path metric differs from the smallest path metric by less than an arbitrarily chosen constant.

However, more effective methods are needed.

SUMMARY OF THE INVENTION

The present invention provides a reduced complexity Viterbi type decoding method and receiver by discarding paths whose metrics differ from a smallest metric by more than a constant related to the minimum distance between paths.

This has advantages including reduction in the complexity of the Viterbi type decoder with estimable

BRIEF DESCRIPTION OF THE DRAWINGS

The drawings are heuristic for clarity.

DESCRIPTION OF THE PREFERRED EMBODIMENTS

The preferred embodiments include both methods and apparatus related to digital information transmission with a Viterbi algorithm type decoding for channel coding. A description of the preferred embodiments requires a preliminary description of digital information transmission and the Viterbi algorithm for decoding.

FIG. 1 is taken from J. B. Huber, *Trelliscodierung—Grundlagen und Anwendung in der digitalen Übertragungstechnik*, Springer—Verlag, Berlin, 1992, and shows the typical arrangement of a digital transmission or communication system. The higher layers of the communication system are comprised in the digital information source 1 and the digital information sink 2. The information sourer 1 is followed by an encoder 4; the information sink 2 is preceded by a decoder 5. The part of the communication system consisting of modulator 11, transmitter output stage 12, transmission medium 13, receiver input stage 14 with prefilter, modulator, amplifier, and demodulator 15 with filter, sampling, and synchronization can be described by an equivalent, time-discrete data channel 3 (indicated with dashed lines) in the baseband, as is described for example in J. G. Proakis, *Digital Communications*, McGraw-Hill, 1989. The digital communication system consisting of encoder 4, equivalent time-discrete data channel 3 and decoder 5 is depicted in FIG. 2.

Figure 2:
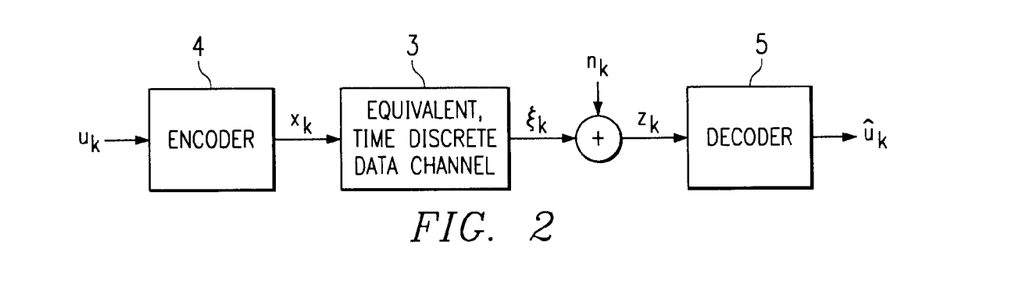
FIG. 2 is a block diagram of a digital communication system with equivalent, time-discrete data channel.

A source symbol at time $k\tau_q$ is denoted as $u_k$ (see FIG. 2); $\tau_q$ denotes the time interval after which the information source 1 outputs a new source symbol; k is an integer number (k= ..., −2, −1, 0, 1, 2, ... ). The sequence of source symbols is denoted as $\{u_k\}$.

From the sequence of source symbols $\{u_k\}$ the encoder 4 generates the sequence of code symbols $\{c_k\}$. Through the encoding process, generally redundancy is added to the code symbols. The encoder 4 outputs the code symbols $c_k$ in the code symbol-interval $\tau_c$. (In general the source symbol-interval $\tau_q$ is not equal to the code symbol-interval $\tau_c$.)

Next, the code symbols $c_k$ are mapped into transmit symbols $x_k$ of the transmitter. In this mapping, blocks of code symbols are mapped into blocks of transmit symbols. The mapping unit outputs the transmit symbols $x_k$ in the modulation interval $\tau$. The mapping unit is contained in the encoder 4 in FIG. 1. The sequence $\{x_k\}$ is the input sequence of the equivalent, time-discrete data channel 3. The input-output relation of the equivalent, time-discrete data channel 3 is given by the following equation:

$$z_k = \sum_{i=0}^{v} h_i x_{k-i} + n_k = \xi_k + n_k, \qquad (1)$$

where the output symbol $\xi_k$ is given by $$\xi_k = \sum_{i=0}^{v} h_i x_{k-i}. \tag{2}$$

The coefficients $h_i$ (i=0, ..., v) in equation (1) denote the impulse response of the equivalent, time-discrete data channel. Both $h_i$ and $x_k$ are complex in general (i.e. consisting of a real and imaginary part). If the impulse response and the symbols $x_k$, $x_{k-1}$, ..., $x_{k-v}$ are known, then the output symbol $\xi_k = \sum_{i=0}^{v} h_i x_{k-i}$ is known. The unpredictable portion of the output signal, caused for example by thermic noise, interference from other transmitters, etc., is summarized in the additive term $n_k$. The sequence $\{n_k\}$ is called additive noise sequence.

The input to the decoder 5 in FIG. 2 is the signal sequence $\{z_k\}$. The decoder 5 has the task to reconstruct the sequence of source symbols $\{u_k\}$ from the signal sequence $\{z_k\}$. The output of the decoder is denoted as $\hat{u}_k$. This notation emphasizes that $\hat{u}_k$ is an estimate of $u_k$.

There exist a number of possible realizations for the decoder 5 in FIG. 2. The simplest decoder is the decision feedback equalizer (DFE), as it is described for example in C. A. Belfiore and J. H. Park, *Decision Feedback Equalization, Proc. IEEE*, vol. 67, pp. 1143–1156, August 1979. This decoder requires very little computational complexity and memory, however, its error rate, i.e. the probability $P(u_k \neq \hat{u}_k)$, is relatively large. The optimum decoder with respect to the probability of an error event (the notion "error event" will be explained below) is the maximum likelihood sequence estimator (MLSE), as it is described in G. D. Forney, *Maximum likelihood sequence estimation of digital sequences in the presence of intersymbol interference, IEEE Trans. Inform. Theory*, vol. IT-18, pp. 363–378, May 1972 and as it is implemented, for example, by the so-called Viterbi-decoder according to G. D. Forney, *The Viterbi Algorithm, Proc. IEEE*, vol. 61, pp. 268–278, March 1973. However, the complexity (i.e. computational complexity and memory requirements) of the Viterbi Decoder grows exponentially with the length of the impulse response v of the equivalent, time-discrete data channel. With a signal alphabet of size M, the computational complexity of the Viterbi Decoder is proportional to $M^{v+1}$ and the memory requirements are proportional to $M^v$. For this reason, numerous approaches have been proposed to reduce the complexity of the Viterbi Decoder without increasing the error rate by too much. The most important approaches are listed here:

1. Only a (previously specified) fixed number of paths in the Viterbi Decoder is extended at each time instant k. This approach is, for example, proposed in A. P. Clark, S. N. Abdullah, S. G. Jayasinghe, and K H. Sun, *Pseudobinary and pseudoquaternary detection processes for linearly distorted multilevel QAM signals, IEEE Trans. Commun.*, vol. COM-33, pp. 639–645, July 1985.
2. A filter which reduces the length v of the impulse response immediately precedes the decoder. Thus, the decoder has a smaller number of states and, therefore, a smaller complexity. Examples for this approach are the decision feedback sequence estimator (DFSE), as it is described in W. U. Lee and F. S. Hill, *A maximum-likelihood sequence estimator with decision-feedback equalization, IEEE Trans. Commun.*, vol. COM-25, pp. 971–979, September 1977 and the delayed decision feedback sequence estimator (DDFSE), as it is described in A. Duel-Hallen and C. Heegard, *Delayed decision-feedback sequence estimation, IEEE Trans. Commun.*, vol. COM-37, pp. J28–436, May 1989.
3. The complexity of the Viterbi Decoder is reduced by partitioning the symbol alphabet of $x_k$ into classes. In that manner, more than one symbol $x_k$ is in general assigned to one class (i.e. the number of classes is in general smaller than the number of symbols). The states of the Viterbi Decoder are then defined by considering only the symbol-classes and thus the number of states is reduced. This approach is known by the name reduced state sequence estimation (RSSE) and is described in M. V. Eyuboglu and S. U. H. Quereshi, *Reduced-state sequence estimation with set partitioning and decision feedback, IEEE Trans. Commun.*, vol. COM-36, pp. 13–20, January 1988, M. V. Eyuboglu and S. U. H. Quereshi, Reduced-state sequence estimation for coded modulation on intersymbol interference channels, IEEE J. Sel. Areas Comm., vol. JSAC-7, pp. 989–995, August 1989, and P. R. Chevillat and E. Eleftheriou, *Decoding of trellis-encoded signals in the presence of intersymbol interference and noise, IEBE Trans. Commun.*, vol. COM-37, pp. 669–676, July 1989.
4. At each time step k only those paths are extended whose path metric differs from the smallest path metric by less than a constant T. The constant T is chosen arbitrarily. This approach was published by G. Zou and J. Weinrichter, *Bounded metric Viterbi decoding of Trellis coded modulation in presence of intersymbol interference, Electronics Letters*, vol. 4, no. 15, July, 1988.

The above approaches are all based on the Viterbi Decoder. The reduction of complexity is achieved either by not extending certain trellis paths (approach 1 and 4) or by combining several states of the Viterbi Decoder into a so-called hyper state (approach 2 and 3). In both cases the number of states is reduced and thus the computational complexity and the memory requirements are reduced. Since the Viterbi Decoder, respectively a decoder reflecting the main functionality and algorithm of the Viterbi Decoder, is also applied in the technique according to the invention and the arrangement according to the invention, the Viterbi Decoder is briefly described in the following.

The complexity (i.e. the computational complexity and memory requirements) of a Viterbi Decoder can be reduced by extending, at each time instant k, only certain paths in the so-called trellis diagram of the Viterbi Decoder. Therefore, the notion of "trellis diagram" in the Viterbi Decoder is explained in the following.

From equation (1) follows that the signal $z_k$ at the output of the equivalent, time-discrete data channel 3 (at time k) not only depends on the current input $x_k$, but also on the the previous inputs $x_{k-1}$, $x_{k-2}$, ..., $x_{k-v}$. Therefore, the (equivalent, time-discrete) data channel is said to have a "memory". The memory of the data channel consists of the v previous input symbols $x_{k-}$, $x_{k-2}$, ..., $x_{k-v}$. The same is true for the encoder 4 in FIG. 2. Its output $x_k$ also not only depends on its current input $u_k$ but in general on $u_{k-1}$, $u_{k-2}$, .... Therefore, also the encoder has a memory.

From this follows: With the known memory of the encoder 4 at time k together with the current input $u_k$ (of the encoder), a unique output symbol $x_k$ is obtained. Equivalently, with the known memory of the (equivalent, time-discrete) data channel 3 at time k together with its current input $x_k$, a unique output symbol $\xi_k$ is obtained. In summary, with the known memory of the encoder 4 and the (equivalent, time-discrete) data channel 3 at time k together with the input $u_k$, a unique output symbol $\xi_k$ is obtained.

Figure 3:
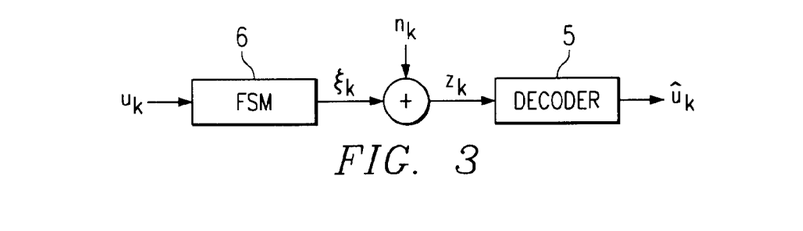
FIG. 3 shows a finite state machine (FSM).

The memory of the encoder 4 and the data channel 3 is combined into an overall-memory and is denoted as state. Therefore, from the state at time k and the input $u_k$ results $\xi_k$. In general the number of states is finite, so that the encoder 4 and the data channel 3 can be described by a so-called finite state machine (FSM) 6. FIG. 3 shows the encoder 4 and the equivalent, time-discrete data channel combined into an FSM 6. The input to the FSM 6 at time k is $u_k$, the output at time k is $\xi_k$. The possible states of the FSM 6 are all possible memory states of encoder 4 and data channel 3.

Figure 4:
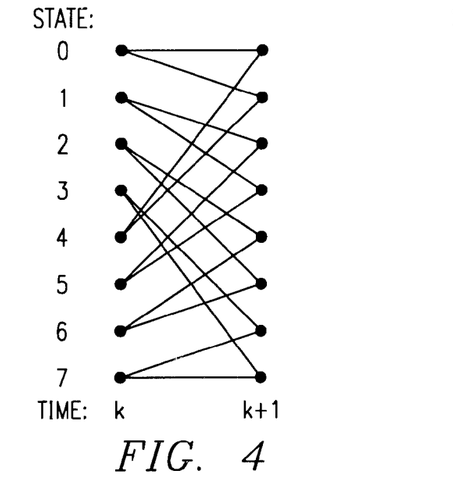
FIG. 4 shows a trellis diagram and the state transitions, respectively, from the time instant k to k+1.

The states of the FSM 6 are indicated as nodes in FIG. 4. With M possible source or input symbols $u_k$, there are M possible transitions from each state (at time k) into states at time k+1. The possible state transitions of the FSM are indicated by lines connecting states at time k with states at time k+1 in FIG. 4. For the purpose of illustration, the number of states in FIG. 4 is equal to 8 and M=2. This state transition diagram is called a trellis.

Each state transition (e.g. from state 5 at time k to state 2 at time k+1, see FIG. 4) has a probability assigned to it. This probability is computed from the output symbol $\xi_k$ associated with the state transition and from the received signal $z_k$. In general, the larger the value of $(z_k - \xi_k)^2$, the less likely is a particular state transition.

Figure 5:
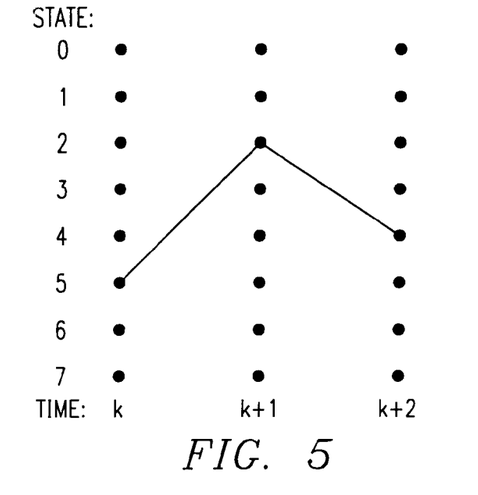
FIG. 5 illustrates a trellis path.

The concatenation of state transitions in the trellis diagram (e.g. the state transition 5→2 between time k and k+1, followed by the state transition 2→4 between time k+1 and k+2 see FIG. 5) is called a trellis path. The so-called path metric keeps track of the probabilities of the state transitions which constitute a path. The path metric $\Gamma_k$ (at time k) of each path is, for example, computed according to the following equation:

$$\Gamma_k = \sum_{i \leq k} (z_i - \xi_i)^2. \quad (3)$$

At each time instant k, k+1, . . . the Viterbi Decoder selects in each state the most likely path (with the smallest path metric) among all paths running into that state. All other paths are discarded. Therefore, at each time instant and for each state, only one path (the most likely path with the smallest path metric $\Gamma$) survives. In theory, at the end of the data transmission (i.e. after the whole sequence $\{u_k\}$ has been sent) the most likely path is estimated as the correct one. The source symbol sequence which corresponds to that path is output by the decoder 5 as the estimated source symbol sequence $\{\hat{u}_k\}$. In practice, the decoder 5 does not wait until the whole sequence $\{u_k\}$ has been sent, but it estimates the sequence $\{\hat{u}_k\}$ with a so-called decision delay of several time intervals.

Figure 6:
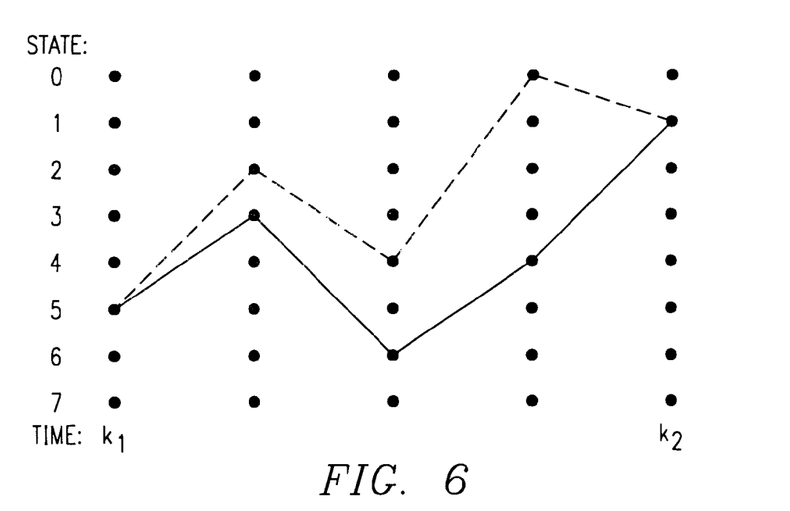
FIG. 6 shows an error event in the trellis diagram.

The basic operation of the Viterbi Decoder has now been described. In order to estimate the error rate, the definition of an error event is still missing. FIG. 6 shows an error event in the trellis diagram. The correct path is indicated by a solid line, the wrong path is indicated by a dashed line. An error event in the Viterbi Decoder occurs at time $k_2$ if the correct trellis path appears less likely to the decoder than a wrong trellis path due to the influence of noise. In other words, an error event occurs at time $k_2$ if the path metric of the correct path is larger than the path metric of an incorrect path. Since the Viterbi Decoder decides at each time step and in each state for the most likely path (with the smallest path metric), the decoder makes an error if this case occurs.

The two paths in FIG. 6 can be described by 2 points in the $(k_2-k_1)$-dimensional Euclidean space. The distance between these two points decides who likely the event is that the wrong path appears more likely than the correct path due to a noise sequence $\{n_k\}$. The minimum distance, called $d_{min}$, between two arbitrary paths in the trellis diagram determines how susceptible the decoder is to an error event. With smaller $d_{min}$, the probability increases that a noise sequence lets the correct trellis path appear less likely than a wrong trellis path. The basic approach for determining the minimum distance $d_{min}$, is explained in the following.

The operation of the Viterbi Decoder and its algorithm and implementation, respectively, are for example described in G. D. Forney, *The Viterbi Algorithm, Proc. IEEE*, vol. 61, pp. 268–278, March 1973 and H. Lou, *Implementing the Viterbi Algorithm, IEEE Sig. Proc. Mag.*, pp. 42–52, September 1995. This operation is adopted for the realization of the invention.

As already mentioned, the complexity (i.e. the computational complexity and memory requirements) of a decoder, especially a Viterbi Decoder respectively a decoder based on the Viterbi algorithm, is reduced according to the invention by letting the decoder extend only certain trellis paths at each time step k. In the following, a possible way of determining the minimum distance $d_{min}$, in the trellis diagram is explained and the selection criterion for trellis paths according to the invention is described.

When determining the path distance in the trellis diagram, the Viterbi Decoder as well as the decoder 5 using the technique according to the invention has to know the data channel 3 (i.e. estimates of the impulse response of the equivalent time discrete data channel 3) and the encoder (i.e. its state transition diagram). In general, the encoder 4 is known to the decoder 5. The decoder 5 obtains estimates of the impulse response, for example, by letting the information source 1 transmit a sequence $\{u_k\}$ which is known to the decoder 5. The decoder 5 or the demodulator 15 can then determine the coefficients $h_i$, i=0, 1, . . . , v and provide those coefficients to the computational unit 7. If the impulse response changes only slowly over time, then the estimation of the impulse response can be done infrequently. If the impulse response changes rapidly over time, however, the impulse response must be estimated in short time intervals (e.g. for mobile communications channels).

The minimum distance $d_{min}$ (sometimes also called free distance $d_{free}$) can be determined solely from the state transition diagram of the encoder 4 and the impulse response of the data channel 3. The computation of the distance and the minimum distance, respectively, between two trellis paths is a known procedure which is described, for example, in J. B. Huber, Trelliscodierung—*Grundlagen und Anwendungen in der digitalen bertragungstechnik*, Springer-Verlag, Berlin, 1992 and the references given therein. This known procedure for determining the distance d and the minimum distance $d_{min}$ can be used in the invention; also other procedures are known and applicable.

The basic approach for determining the distance d between two trellis paths is first explained for "uncoded" data transmission. In uncoded data transmission, the sequence of transmit signals $\{x_k\}$ is directly generated from the source sequence $\{u_k\}$. The distance between two sequences $\{\xi_k\}$ and $\{\hat{\xi}_k\}$ is given by:

$$d = \|\{\xi_k\} - \{\hat{\xi}_k\}\| = \sum_k (\{\xi_k\} - \{\hat{\xi}_k\})^2, \quad (4)$$

where $$\xi_k - \hat{\xi}_k = \sum_{i=0}^{v} h_i x_{k-i} - \sum_{i=0}^{v} h_i \hat{x}_{k-i} \quad (5)$$

$$= \sum_{i=0}^{v} h_i (x_{k-i} - \hat{x}_{k-i})$$

$$= \sum_{i=0}^{v} h_i \varepsilon_{k-i}.$$

The variable $\epsilon_k$ in equation (5) is defined as $\epsilon_k = x_k - \hat{x}_k$. In addition, the variable $\Delta\xi_k$ is defined as $\Delta\xi_k = \xi_k - \hat{\xi}_k$ and consequently also the sequence $\{\Delta\xi_k\} = \{\xi_k\} - \{\hat{\xi}_k\}$ is defined.

Figure 7:
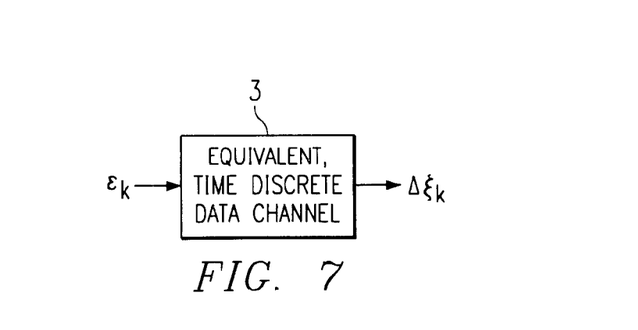
FIG. 7 shows the determination of the distance between two trellis paths for uncoded data transmission for an equivalent time-discrete data channel.

Equations (4) and (5) show that the distance between two paths is dependent on the input error sequence $\{\xi_k\}$. As can be seen from equation (5), the difference $\Delta\xi_k = \xi_k - \hat{\xi}_k$ depends on $\xi_k$ and the previous input errors $\xi_{k-1}, \xi_{k-2}, \ldots, \xi_{k-v}$. A comparison of equation (2) with equation (5) shows that for determining the distance between two trellis paths, the (equivalent, time discrete) data channel from FIG. 2 can be considered with the input error sequence $\{\xi_k\}$ (see FIG. 7).

The distance between two paths in the trellis diagram which emanate from a common state and merge in a common state (see FIG. 6) can, for example, be determined like this: The correct path in the trellis diagram (see FIG. 6) corresponds to the input error sequence $\{\xi_k\} \equiv 0$ in the trellis diagram (i.e. all input errors $\xi_k$ are equal to 0).

Figure 8:
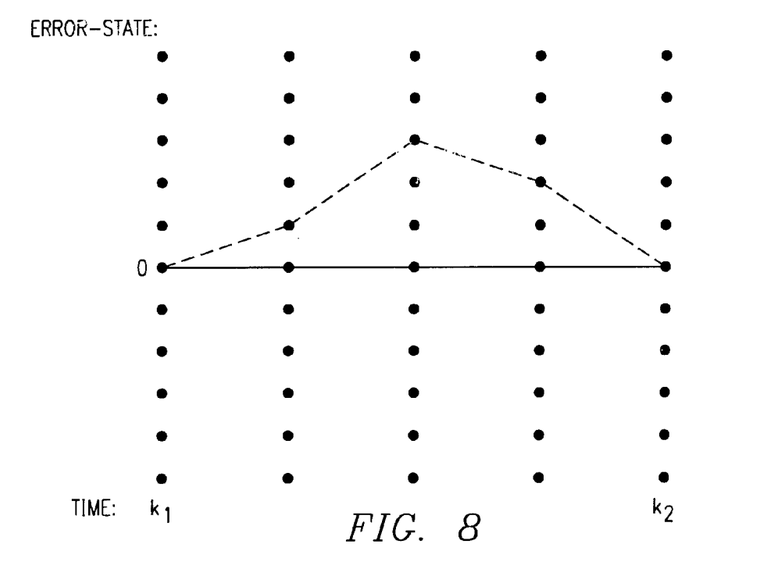
FIG. 8 shows an error event in the eror-trellis diagram.

In the error trellis diagram of FIG. 8 the path which corresponds to the correct path in the trellis diagram is indicated by a solid line. This path emanates from the error state 0 at each time step and transitions into the error state 0 at each time step. Starting from the error state 0, every output error sequence $\{\Delta\xi_k\}$ resulting from an input error sequence $\{\xi_k\}$ which returns to the error state 0 is examined. FIG. 8 shows a possible error path in the error trellis diagram.

The error path is indicated by a dashed line. The distance between the correct and the error path is then computed according to equation (4):

$$d = \|\{\Delta\xi_k\}\| = \|\{\xi_k\} - \{\hat{\xi}_k\}\| = \sum_k (\{\xi_k\} - \{\hat{\xi}_k\})^2. \quad (6)$$

For each error path, the summation in equation (6) extends from time $k_1$, where the error path deviates from the error state 0, to time $k_2$, where the error path returns to the error state 0. The minimum distance $d_{min}$ is the smallest distance of a path that deviates from the error state 0 and returns to the error state 0.

For coded data transmission, the encoder has to be considered for computing the distance between two trellis paths. The block diagram in FIG. 9 for the computation of the distances between trellis paths is taken from B. E. Spinnler and J. B. Huber, *Design of hyper states for reduced-state sequence estimation*, AE, vol. 50, no. 1, 1996. An error event for coded data transmission also corresponds to a pair of paths in the trellis diagram, where the correct and the error path emanate from a common state and merge in a common state (a few time intervals later) (see FIG. 6). Starting from a same state of the encoder 1 and encoder 2 and from the error state 0 of the equivalent time discrete data channel, two different input sequences $\{u_k\}$ and $\{\hat{u}_k\}$ are considered for computing the path distances. Since a path distance only depends on the sequence $\{\Delta\xi_k\}$, and since $\{\Delta\xi_k\}$ in turn only depends on $\{\xi_k\}$, the difference of the two encoder outputs is computed ($\xi_k = x_k - \hat{x}_k$) and input to the equivalent time discrete data channel, see FIG. 9.

Figure 9:
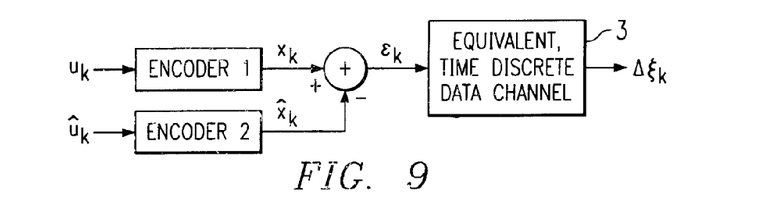
FIG. 9 shows the determination of the distance between two trellis paths for coded data transmission.

The computation of the distance between two trellis paths is performed over as many time steps until the two encoders have returned to one and the same state and the equivalent time discrete data channel has returned to the error state 0. The minimum distance $d_{min}$ is the smallest distance between two trellis paths found in this manner.

The decoder 5 according to the invention proceeds according to the known Viterbi Decoder algorithm, with the modification that at each time step k only those paths are extended whose path metric $\Gamma_k$ differs from the minimum path metric $\Gamma_{k,min}$ (at time k) by less than a threshold T. The threshold T is specified based on the distance profile in the trellis diagram. The basic approach for computing the distance between trellis paths ha been explained above.

Since the determination of the minimum distance $d_{min}$ between two trellis paths in general entails some computational effort, also some other distance d ($d \geq d_{min}$) between two trellis paths can be determined and used to specify the threshold T. According to the invention it is provided that a determined distance d between two trellis paths in the trellis diagram is chosen as the threshold T, where d is possibly supplemented with an additive or multiplicative term.

It is preferable that the threshold T is computed according to the equation $$\frac{1}{4}\left(\frac{d_{min}}{2}\right)^2 \leq T \leq 4\left(\frac{d_{min}}{2}\right)^2, \quad (7)$$

preferably $$\frac{1}{2}\left(\frac{d_{min}}{2}\right)^2 \leq T \leq 2\left(\frac{d_{min}}{2}\right)^2, \quad (8)$$

where $d_{min}$ is the smallest determined, or smallest possible distance between two trellis paths.

Figure 10A:
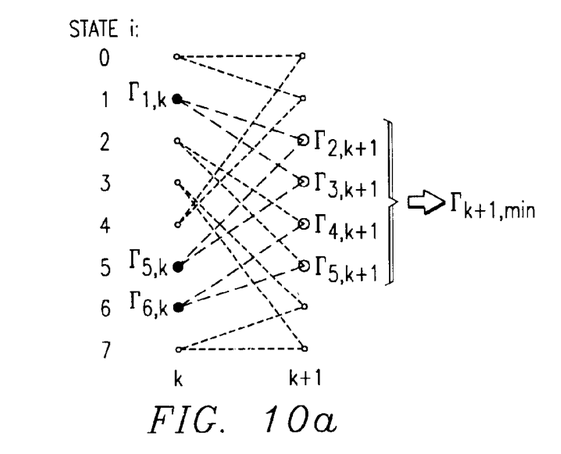
FIG. 10 is a trellis diagram for a preferred embodiment.

FIG. 10 shows the main steps in the procedure according to the invention. For the purpose of illustration, the FSM is again assumed to have 8 states and M=2. The "dark" nodes at time k (see FIG. 10(a)) indicate states for which the path metric $\Gamma_k$ at time k differed from the minimum path metric $\Gamma_{k,mim}$ by less than T. Only paths ending in those states are considered at the next state transition. Those state transitions are indicated by dashed lines in FIG. 10(a). All other possible state transitions in the trellis diagram, indicated as dotted lines, are only shown for comparison with FIG. 4.

The extended paths in FIG. 10(a) end in states at time k+1 which are indicated by "light" nodes. For each of these states i, just like in the Viterbi-Decoder, the path with the smallest path metric $\Gamma_{i,k+1}$ has to be determined among all paths running into that state i. In state 2, for example, two trellis paths with different path metrics meet at time k+1; the path with the smaller path metric is accepted as more likely and state 2 consequently has the path metric $\Gamma_{2,k+1}$. Among the path metrics $\Gamma_{2,k+1}, \Gamma_{3,k+1}, \Gamma_{4,k+1}, \Gamma_{5,k+1}$ of the reached states 2, 3, 4, 5, the minimum path metric $\Gamma_{k+1,min}$ at time k+1 is determined. Next, those path metrics $\Gamma_{i,k+1}$ (at time k+1) are determined which differ from the minimum path metric $\Gamma_{k+1,min}$ by less than T. Only those paths whose path metric $\Gamma_{i,k+1}$ at time k+1 differs from the minimum path metric $\Gamma_{k+1,min}$ by less than T will be considered at the state transition k+1→k+2. The states of paths whose path metric $\Gamma_{i,k+1}$ at time k+1 differs from the minimum path metric $\Gamma_{k+1,min}$ by less than T are indicated by "dark" nodes in FIG. 10(b).

Figure 10B:
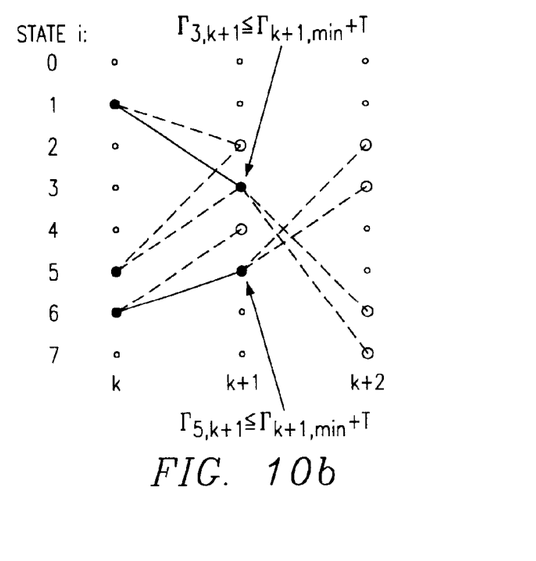

The procedure described above for the state transition k→k+1 applies analogously to the state transition k+1→k+2.

Figure 11:
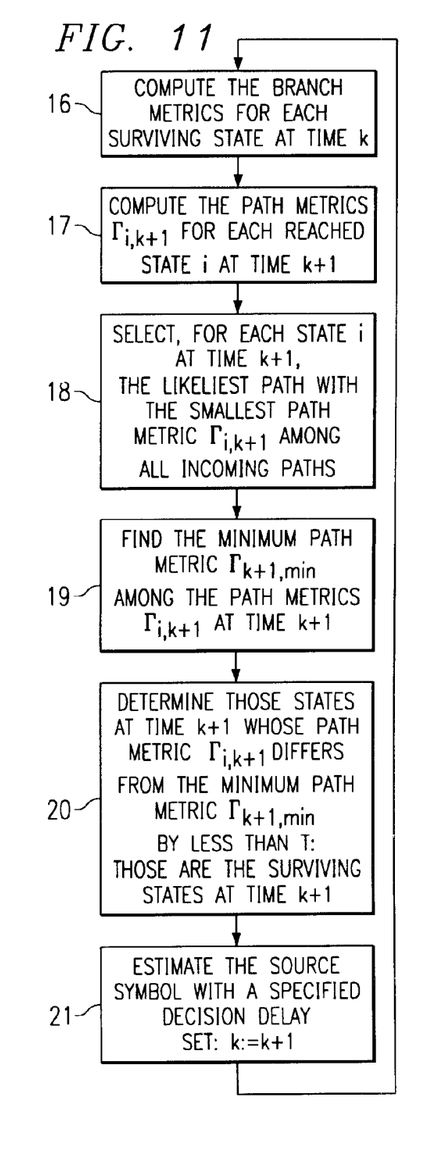
FIG. 11 is a flow chart.

In the flow chart of FIG. 11, the states (resp. paths) at time k whose path metric $\Gamma_{i,k}$ differs from the minimum path metric $\Gamma_{k,min}$ by less than T are called "surviving" states at time k. These are the states indicated by dark nodes in FIG. 10(a).

The states which are reached from survivor states at time k are called "reached" states at time k+1. These are the states indicated by light nodes in FIG. 10(a).

According to the flow chart in FIG. 11, for each surviving state at time k the branch metrics are determined in 16. Next in 17, the path metrics $\Gamma_{i,k+1}$ of states at time k+1 are computed which are reached from surviving states at time k. In 18, the smallest path metric is determined among all paths running in the same state i; this smallest path metric in each state i at time k+1 becomes the new path metric $\Gamma_{i,k+1}$. Among those new path metrics $\Gamma_{i,k+1}$ the minimum path metric $\Gamma_{k+1,min}$ at time k+1 is determined in 19.

According to 20, the states are determined at time k+1 whose path metric $\Gamma_{i,k+1}$ differs from the minimum path metric $\Gamma_{k+1,min}$ by less than T. Those states survive at time k+1 and are considered further, after we set k→k+1 in 21. At the same time, the decoder 5 estimates a source symbol with a specified decision delay.

Figure 12:
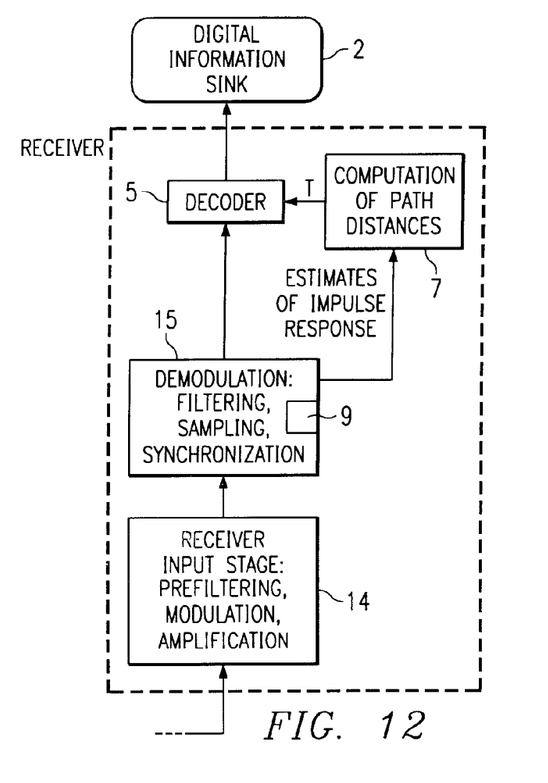
FIG. 12 is a block diagram with a preferred embodiment decoder.

The block diagram in FIG. 12 schematically shows the structure of a receiver with a decoder 5 according to the invention.

The decoder 5 is connected to a computational unit 7, or the decoder includes a computational unit and memory unit 7, where the threshold T is determined. The threshold T corresponds to a determined distance d between two trellis paths in the trellis diagram, where d is possibly supplemented with an additive or multiplicative term.

Figure 13:
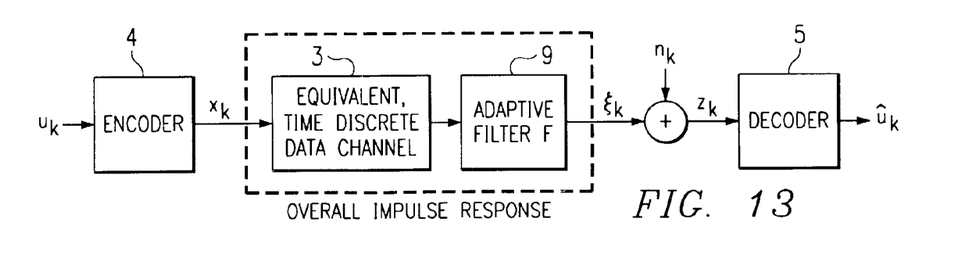
FIG. 13 is a block diagram with an additional filter.

Part 15 in the receiver can contain an additional filter 9 which precedes the decoder 5. This filter 9 has the task to modify a possibly time variant impulse response of the equivalent time discrete data channel 3, as shown in FIG. 2, in a manner such that the overall impulse response consisting of discrete data channel 3 and filter 9 remains unchanged (or as unchanged as possible). A block diagram of the digital communication system with the additional filter 9 is depicted in FIG. 13. The advantage of this arrangement is that the path distances in the trellis diagram need not be recomputed if the overall impulse response remains unchanged. The basic approach for adapting the filter 9 to a time-varying equivalent time discrete data channel, such that the overall impulse response remains unchanged, is known in the literature and is described, for example, in J. G. Proakis, *Digital Communications*, McGraw-Hill, 1989.

The principal arrangement of the receiver in FIG. 12 remains unchanged by adding the adaptive filter 9. In practice, the filter 9 is placed in the demodulator 15 in FIG. 12.

What is claimed is:

1. Technique for the Viterbi-type decoding In a transmission of digital data in a digital communication system from a digital information source (1) via an encoder (4) and a data channel (3) to a digital information sink (2) which is preceded by a decoder (5) in which the data transmitted by the information source (1) are decoded, and where the most likely transmitted data sequence is forwarded to the information sink (2), determining the decoder (5) states according to a trellis diagram, under consideration of an impulse response of the data channel (3) and under consideration of a state transition diagram of states of the encoder (4), where trellis time intervals in said trellis diagram are dependent on symbol time intervals between source symbols output by the information source (1), a determining a path metric ($\Gamma$) for all state transitions emanating from a certain number of states at a time instant at the end of a said trellis time interval, and where the likeliest path with the smallest path metric ($\Gamma$) among several paths running into one reached state is assumed as correct respectively is accepted, determining among said path metrics ($\Gamma$) assigned to the reached states a minimum path metric ($\Gamma_{min}$) and considering and extending from each reached state, state transitions at the next trellis time interval, only if the path metric ($\Gamma$) of that state at that time Instant does not differ from the minimum path metric ($\Gamma_{min}$) by more than a specified distance respectively threshold (T) when $\Gamma-\Gamma_{min} \leq T$, characterized by forming the threshold (T) using a determined distance (d) between two trellis paths in the trellis diagram extending over a certain number of trellis time intervals, where (d) is possibly supplemented with an additive or multiplicative term.

2. Technique according to claim 1, wherein the distances (d) between a number of, preferably all possible, trellis paths are determined, which emanate from a common state and merge in a common state.

3. Technique according to claim 1, characterized by the feature that a computation of the distance (d) of trellis-path-pairs is performed at each time instant respectively trellis time interval.

4. Technique according to claim 1, characterized by the feature that at each new estimation resp. new computation of the impulse response of the data channel (3) and/or of the state transition diagram of the encoder (4), a new computation of the distances (d) of trellis-path-pairs is performed.

5. Technique according to claim 1, characterized by the feature that the determination of the distances (d) of trellis-path-pairs performed at each arrival of another respectively a new data packet.

6. Technique according to claim 1, characterized by the feature that in receiver input stage (14), in demodulator (15) or In the decoder (5) a new estimation respectively new computation of the impulse response of the data channel (3) is performed, with known source symbols which are transmitted by the information source (1) in specified time intervals, on which the further computations are based, or (nonexclusively) that a change in the state transition diagram of the encoder (4), conveyed to the receiver input stage (14), the demodulator (15) or the decoder (5), is basis for the further computations.

7. Technique according to claim 1, characterized by the feature that the value of a distance (d), which is possibly supplemented with an additive or multiplicative term and which is used for determining the threshold (T), is smaller than the largest determined distance.

8. Technique according to claim 1, characterized by the feature that the smallest determined distance ($d_{min}$) is used for determining the threshold (T).

9. Technique according to claim 1, characterized by the feature that the threshold (T) is computed according to $$\frac{1}{4}\left(\frac{d_{min}}{2}\right)^2 \leq T \leq 4\left(\frac{d_{min}}{2}\right)^2, \quad (1)$$

preferably $$\frac{1}{2}\left(\frac{d_{min}}{2}\right)^2 \le T \le 2\left(\frac{d_{min}}{2}\right)^2. \quad (2)$$

where ($d_{min}$) is the smallest determined, or the smallest possible, distance between all pairs of trellis paths.

10. Technique according to claim 1, characterized by the feature that the impulse response of the data channel (3) is convolved with the impulse response of an adaptive filter (9) in order to keep the overall impulse response of said data channel (3) and filter (9) constant.

11. Arrangement for the Viterbi-type decoding in a transmission of digital data in a digital communication system from a digital information source (1) via an encoder (4) and a data channel (3) to a digital information sink (2) which is preceded by a decoder (5) in which the data transmitted by the information source (1) are decoded and where the most likely transmitted data sequence is forwarded to the information sink (2), where in the decoder (5) states are determined and specified according to a trellis diagram under consideration of an impulse response of the data channel (3) and under consideration of a state transition diagram of the encoder (4), where the trellis time intervals in said trellis diagram are dependent on the symbol time intervals between source symbols output by the information source (1), where in said trellis time intervals respectively at the respective time instances at the ends of said trellis time intervals, a path metric ($\Gamma$) is determined for all state transitions emanating from a certain number of states at such a time instant, and where the likeliest path with the smallest path metric ($\Gamma$) among several paths running into one reached state is assumed as correct respectively is accepted, where among said path metrics ($\Gamma$) assigned to the reached states a minimum path metric ($\Gamma_{min}$) is determined and where from each reached state, state transitions are only considered respectively extended at the next time interval, if the path metric ($\Gamma$) of that state at that time instant does not differ from the minimum path metric ($\Gamma_{min}$) by more than a specified distance respectively threshold (T), when $\Gamma - \Gamma_{min} \le < T$, wherein the decoder (5) is connected to a computational unit (7) or the decoder includes a computation area (7) in which the threshold (T) is determined, where a determined distance (d) between two trellis paths in the trellis diagram is used for computing the threshold (T), where (d) Is possibly supplemented with an additive or multiplicative term.

12. Arrangement according to claim 11, characterized by the feature that in the computational unit (7) or in the computation area (7), said trellis diagram is constructed for a certain number of trellis time intervals, and that the distance (d) between two trellis paths Is computed according to a Euclidian distance.

13. Arrangement according to claim 12, characterized by the feature that at each new estimation respective new computation of the impulse response of the data channel (3), a new computation of the distances (d) between trellis paths is performed in the computational unit (7).

14. Arrangement according to claim 11, characterized by the feature that at least a comparator or subtracting unit is provided in the decoder (5) for comparison of the path metrics ($\Gamma$) of a respective reached state and for the consequent determination of the smallest path metric ($\Gamma$), and for comparison of the minimum path metric ($\Gamma_{min}$), which is incremented by the threshold (T), with a number of, preferably with all, determined path metrics ($\Gamma$) of those states.

15. Arrangement according to claim 11, characterized by the feature that the decoder (5) is preceded by an adaptive filter (9), where the impulse response of the data channel (3) is convolved with the impulse response of the filter (9) in order to keep the overall impulse response consisting of said data channel (3) and filter (9) constant.

* * * * *